US012802669B2

(12) United States Patent
Majdalany

(10) Patent No.: US 12,802,669 B2
(45) Date of Patent: Nov. 17, 2026

(54) DISPENSER FOR MUSIC SHEETS

(71) Applicant: Red Tusk Records, LLC, Toluca Lake, CA (US)

(72) Inventor: Nadeem Majdalany, Toluca Lake, CA (US)

(73) Assignee: Red Tusk Records, LLC, Toluca Lake, CA (US)

( * ) Notice: Subject to any disclaimer, the term of this patent is extended or adjusted under 35 U.S.C. 154(b) by 286 days.

(21) Appl. No.: 18/785,256

(22) Filed: Jul. 26, 2024

(65) Prior Publication Data

US 2026/0031070 A1 Jan. 29, 2026

(51) Int. Cl.
*G10G 1/00* (2006.01)
*A63J 21/00* (2006.01)

(52) U.S. Cl.
CPC ................ *G10G 1/00* (2013.01); *A63J 21/00* (2013.01)

(58) Field of Classification Search
CPC .. G10G 1/00; G10G 7/00; A63J 21/00; G16H 20/13; G07F 9/02; A47F 3/02; A47F 10/02; A47F 10/025; A47J 21/00
See application file for complete search history.

(56) References Cited

U.S. PATENT DOCUMENTS 4,950,167 A * 8/1990 Harris ...................... G09B 3/06 434/327
5,520,450 A * 5/1996 Colson, Jr. .......... G07F 17/0092 340/5.5
6,623,366 B2 9/2003 Fiedler
6,905,140 B2 6/2005 Polick
7,718,883 B2 5/2010 Cookerly
8,246,124 B2 * 8/2012 Mackillop ............. E05C 19/002 312/216
8,919,561 B2 12/2014 Boisseau
10,216,157 B2 * 2/2019 Savage .................. G05B 15/02
11,037,539 B2 6/2021 Silverstein
11,690,924 B1 * 7/2023 Gokcebay ................. A47F 9/00 250/455.11
2004/0161729 A1 * 8/2004 Reed ........................ G09B 3/00 434/128
2012/0267990 A1 * 10/2012 Krawczyk .............. B65G 1/137 312/215
2016/0053514 A1 * 2/2016 Savage ................. E05B 65/025 312/326

FOREIGN PATENT DOCUMENTS

CN 116486536 A * 7/2023 ............. G07F 17/12
DE 202019000142 U1 * 2/2019 ............... G09B 3/02
DE 202019105744 U1 * 1/2021 ............... A47F 3/02

OTHER PUBLICATIONS

"Enclosure—Definition & Meaning", Merriam-Webster, accessed at https://www.merriam-webster.com/dictionary/enclosure on Jul. 24, 2026 (Year: 2026).*

* cited by examiner

*Primary Examiner* — Erin Kryukova
(74) *Attorney, Agent, or Firm* — SoCal IP Law Group LLP; Steven C. Sereboff

(57) ABSTRACT

There is disclosed a dispenser for music sheets.

18 Claims, 4 Drawing Sheets

FIG. 3
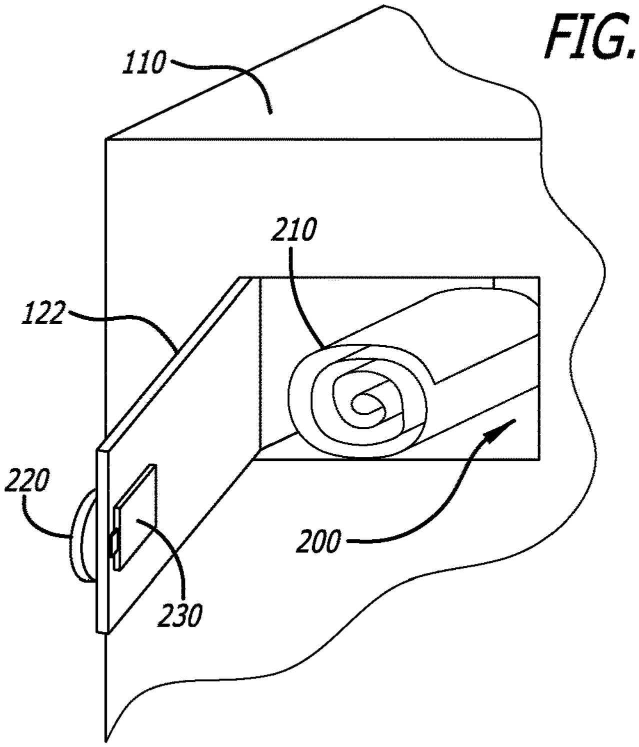
FIG. 4
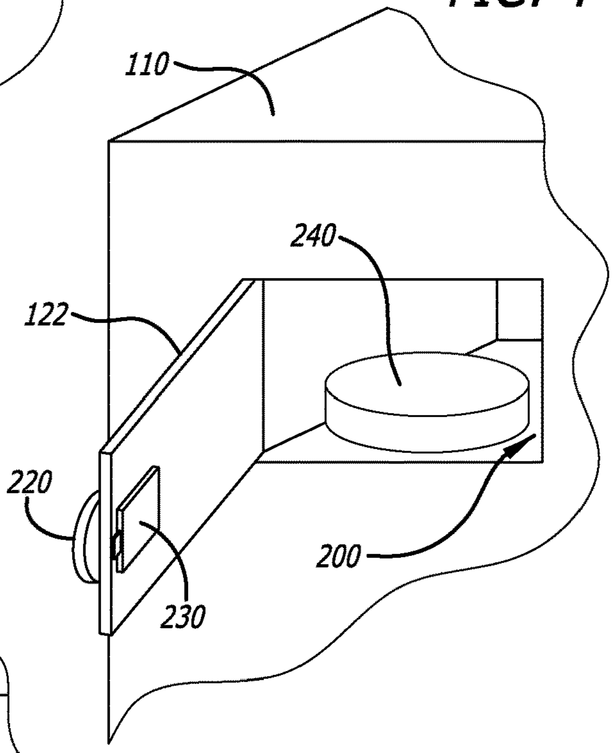
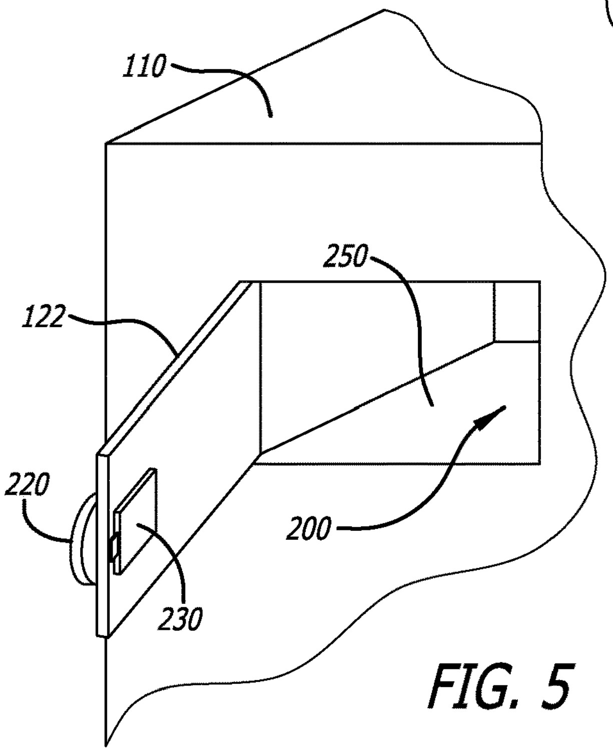
FIG. 5

FIG. 6
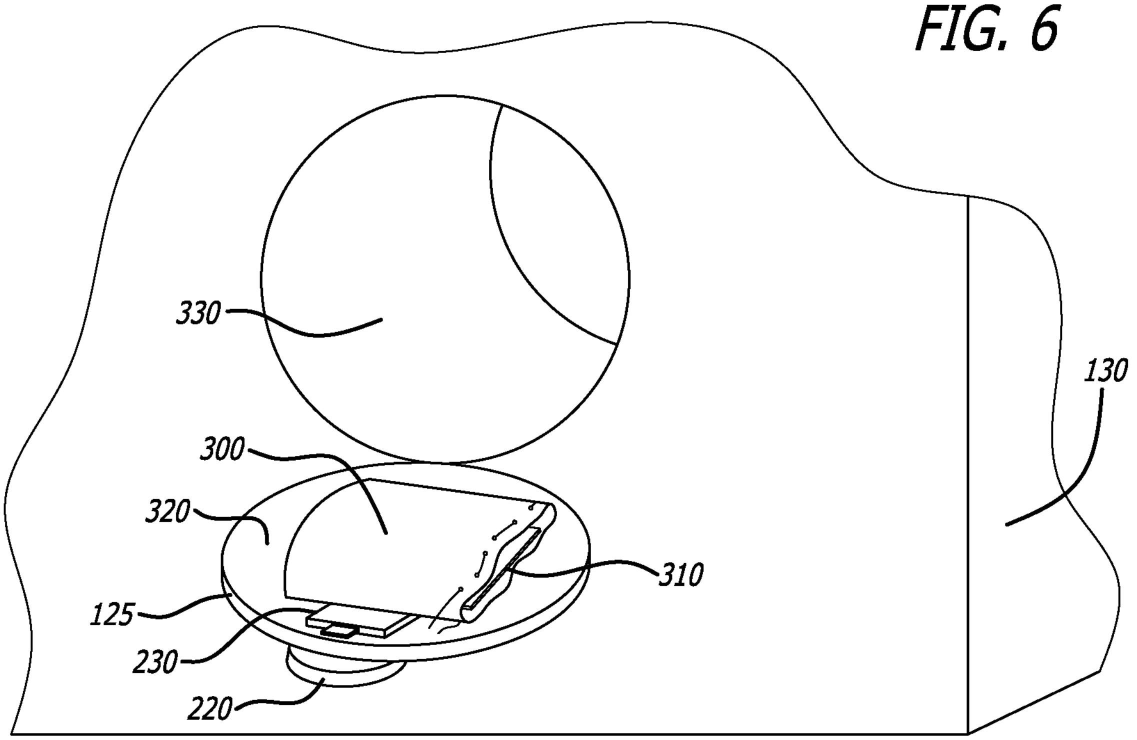
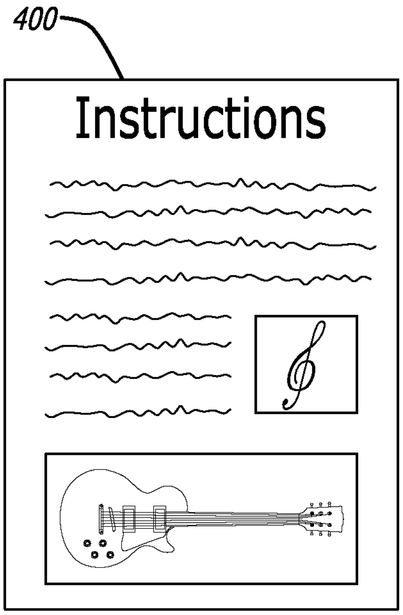
FIG. 7
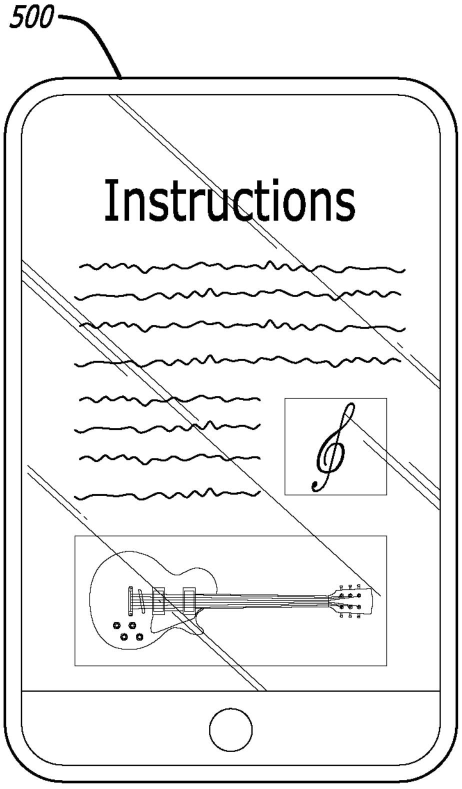
FIG. 8

DISPENSER FOR MUSIC SHEETS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to dispensers for music sheets and other performance assignments, and processes for use thereof.

Description of the Related Art

An impromptu performance is one in which the performers are prompted by the occasion rather than being planned in advance. An impromptu performance has little or no preparation; it is extemporaneous. The benefits of collaboration by performers is well appreciated.

Impromptu performance works best when the performers are highly skilled in their art form (e.g., music, comedy, dance), more so when they are experienced at impromptu performance, and even more so when the performers have a lot of experience working with one another in impromptu performance. On the other hand, an impromptu performance is usually less satisfying for the audience assembled when the performers do not have a lot of experience working with one another in impromptu performance, or when one or more of the performers are inexperienced at impromptu performance, or if one or more of the performers are not highly skilled in their art form.

The scope of an impromptu performance may vary. In musical improvisation, each performer typically performs without guidance, and therefore each performer has complete discretion of their performance. In comedy improv, there is typically a prompt for each or all of the performers which gives them a general idea of what to do, but then each performer has complete discretion of their performance.

Even in performances where the performers receive some form of prompt, such as instructions spoken to them or on a slip of paper, the audience gains little. The prompting is an obstacle to the show. Prompting typically delays the show, and the audience sits unentertained while awaiting the entertainment.

DESCRIPTION OF THE DRAWINGS

FIG. 3 is a partial view of the dispenser with a rectangular cell open and holding an instruction sheet.

FIG. 4 is a partial view of the dispenser with the rectangular cell open and holding a coin.

FIG. 5 is a partial view of the dispenser with the rectangular cell open and empty.

FIG. 6 is a partial view of the dispenser with a round cell open with a pouch on the cell door.

FIG. 7 is a paper instruction sheet.

FIG. 8 shows instructions on an electronic display.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

Figure 1:
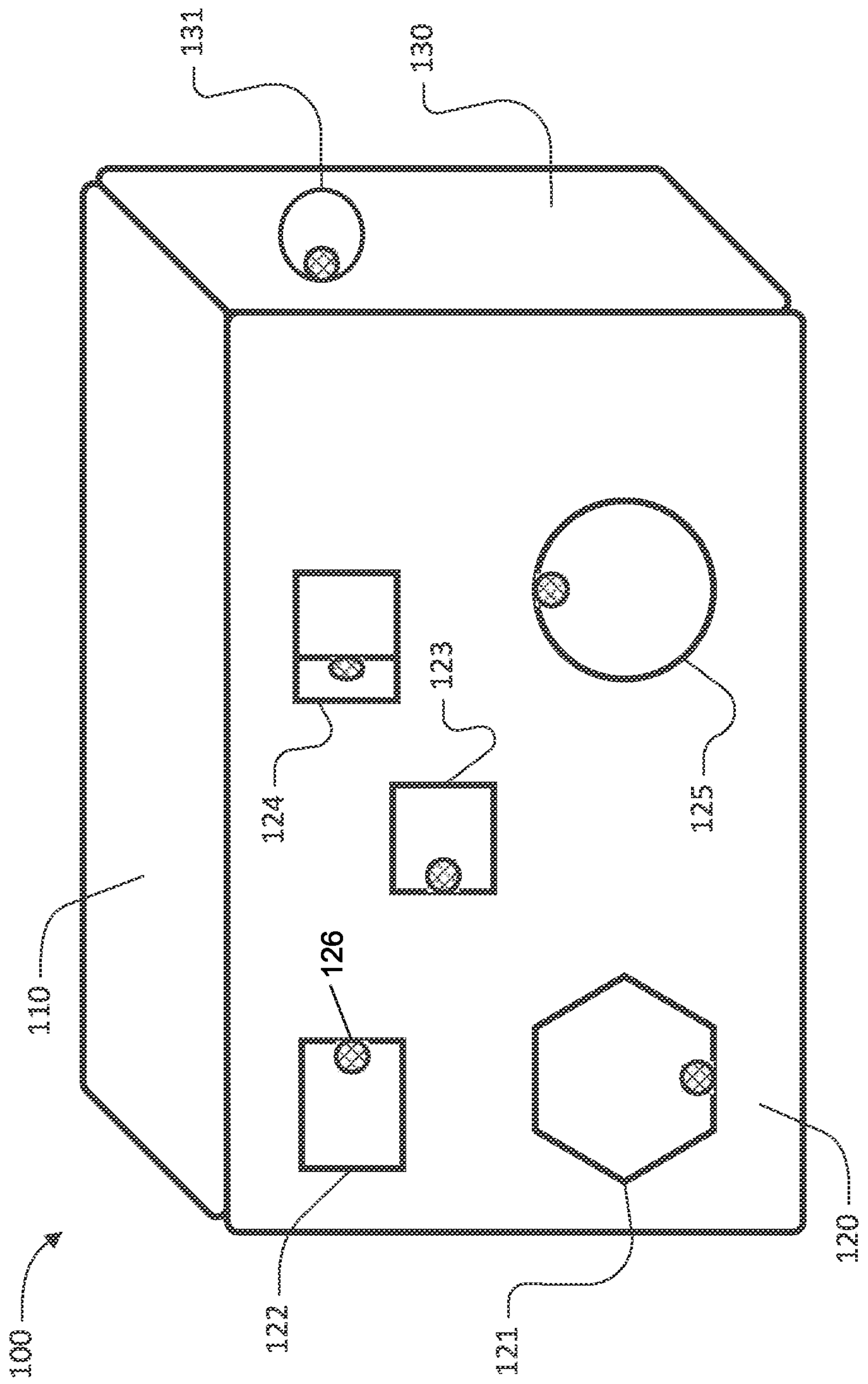
FIG. 1 is a dispenser of music sheets and other performance assignments.

Referring now to FIG. 1 there is shown a dispenser 100 adapted for distribution of instructions for an impromptu performance. The performance may be performed by a number of performers.

The performance may be before an audience. Some or all of the audience may be in the same place as the performers, such as in a studio, an auditorium, a theater or an amphitheater. Some or all of the audience may be remote from the performance, such as watching on TV or a stream. The audience may experience the performance in real time, delayed or on-demand.

The dispenser 100 is a physical object which may take the form of an enclosure defining a number of cells. The dispenser 100 has a three-dimensional shape which may be a hexahedron, such as a cube. The shape of the dispenser may be regular or irregular.

The cells of the dispenser have respective openings which themselves may have access doors. Embodiments of cells are shown in FIG. 3-FIG. 6. In FIG. 3, FIG. 4 and FIG. 5 the cell 200 is rectangular with access door 122. In FIG. 6 the cell 330 is round with access door 320. The access doors 122, 320 include a respective knob 220 and a latch 230. In FIG. 6 the cell 330 has a pouch 300. The number of cells may be equal to or greater than the number of performers. The openings provide access to the cells. FIG. 1 shows, for example, six access doors 121, 122, 123, 124, 125, 131. FIG. 1 shows access doors on two sides of the dispenser 100, but the openings and therefore the access doors may be anywhere on the dispenser 100 provided that a person can access them. For example, the hexahedron may have openings on the bottom surface of the dispenser, so long as there is a means for getting to them such as by raising the dispenser, turning the dispenser, or supporting the dispenser above the floor. The openings and access doors may have the same or differing shapes, such as rectangle 122, 124, square 123, hexagon 121, circle 125. The shape of the opening and access door may be regular or irregular, and the access door may be flat or topographic.

The dispenser 100 is loaded with performance assignments, either instruction sheets such as music sheets or prompt sheets (e.g., instruction sheet 400 in FIG. 7, instruction sheet 210 in FIG. 3), or identifiers corresponding to instruction sheets, in the cells. The identifier may be a card (e.g., instruction card 310 in FIG. 6) or electronic display 500 (FIG. 8) bearing a marking such as a number, a letter or a shape, or may be some other physical object (e.g., object 240 in FIG. 4), such as a statuette. The identifiers provide a way to obtain an instruction sheet without having the instruction sheet itself loaded into the dispenser 100. The purpose of the cells is to hold the performance assignments. Thus, the size, shape and placement of the cells corresponds to that of the performance assignments. For example, the cells may be integrated with the openings, or may be pouches or receptacles attached to or inside of the openings. The performance assignments may be attached to or integrated with the openings or the access doors or the cells. The cells may have varying sizes and shapes. The dispenser may have only instructions sheets, or only identifiers, or a mix. Accordingly, each instruction sheet is assigned to one of the cells, either by directly loading into a cell or having its identifier loaded into a cell. A given cell will have only one performance assignment.

Each instruction sheet has instructions for one part of the performance. At least some of the instruction sheets are different from the others, and each instruction sheet may be different from all of the others. The instructions on the instruction sheets may be customized for a specific type of performer (e.g., a piano player or a trumpet player), and may be prepared in such a manner that any or many of the performers can use the instructions (e.g., a music sheet with is readily transposed for different instruments). The number of instruction sheets may be equal to or greater than the number of performers.

The instruction sheets may take various forms, and the form may depend on the nature of the performance, the nature of the performers, the preference of the performers, and/or the entertainment value of how instructions are provided to the performers. Instruction sheets may be printed paper, cue cards or electronic displays. The instructions sheets need not be uniform, but there may be a beneficial entertainment value to uniformity in some aspects.

The access doors 121, 122, 123, 124, 125, 131 are normally closed, and thereby hide from the audience the performance assignment contained in the cell. Thus, for each of the cells, opening the cell's access door provides access to the performance assignment. There may be an indicator (e.g., 126) associated with one or more of the openings. The indicator indicates whether the opening has been opened to thereby also indicate whether the cell was accessed and the performance assignment removed. One or more of the access doors may have a latch and a dial (e.g., 126), wherein the dial is operable to retract the latch and thereby provide access to the cell. The dial may be the indicator. The indicator may take the form of a light which turns on or off, a color change, or a shape change. After an access door has been opened and the performance assignment removed (emptiness 250 in cell 200 is shown in FIG. 5), re-closure of the access door may result in it being locked to prevent re-opening during the performance.

Figure 2:
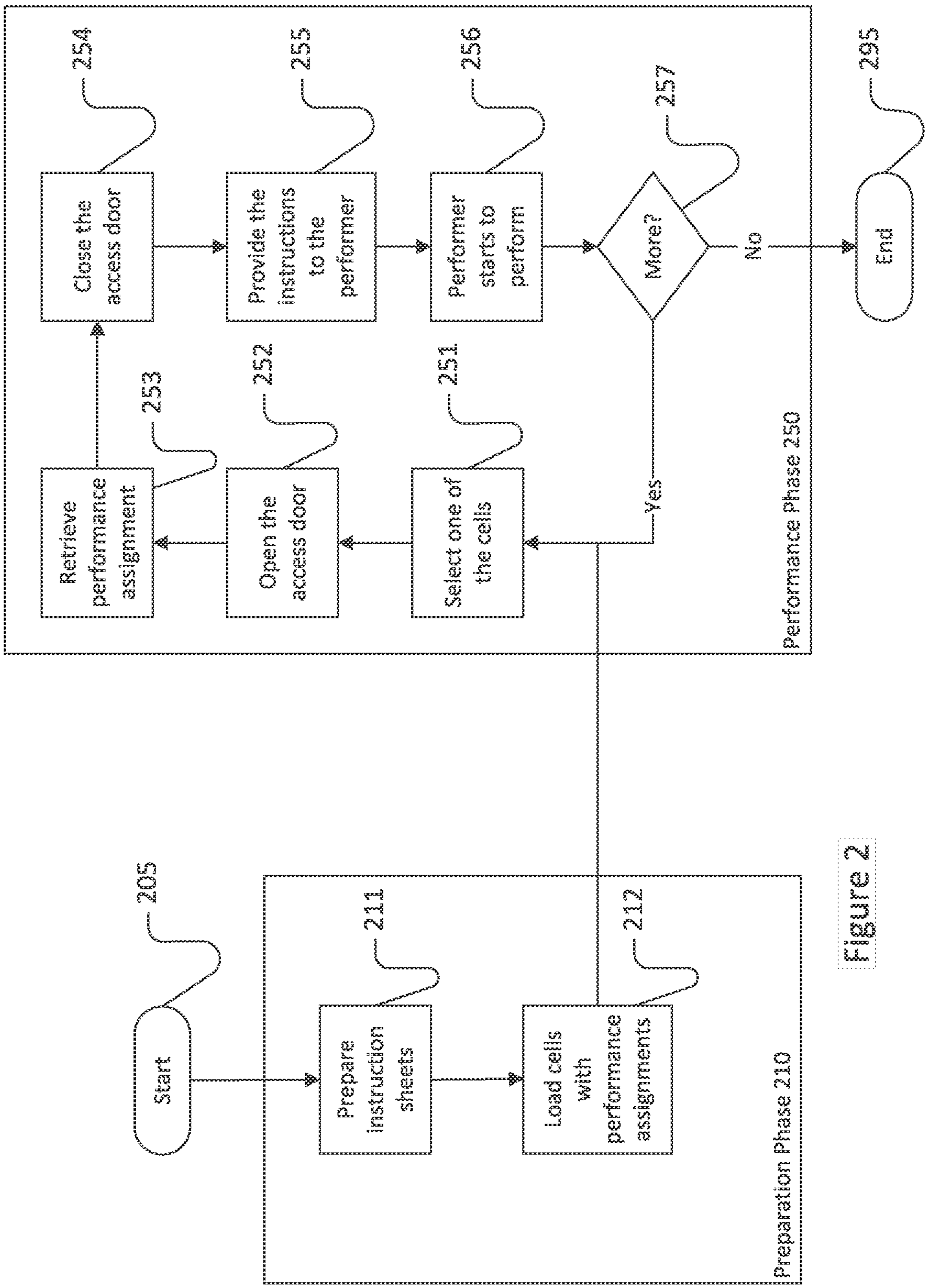
FIG. 2 is a flowchart of a process for using the dispenser.

Referring now to FIG. 2 there is shown a flowchart 200 of a process for an impromptu collaborative performance using a dispenser such as the dispenser 100 of FIG. 1. In general, there are two phases-a preparation phase 210 and a performance phase 250. The process has a start 205 and an end 295, and may be repeated.

The benefit of using the dispenser is not merely as a mechanism for distributing instruction sheets. Rather, the use of the dispenser is entertaining to the audience and fun for the performers. For this reason, the dispenser may have an artistic appearance, and its use may be akin to a magic show. Thus, unlike typical impromptu performances where providing instructions to performers is uninteresting and an impediment to the performance, use of the dispenser is part of the show. It replaces ordinary distribution with a grand reveal.

In the preparation phase 210, the instruction sheets are prepared (211) and then the performance assignments are loaded into the cells of the dispenser (212). If an identifier is to be loaded into a cell rather than an instruction sheet, the corresponding instruction sheet should be marked to correlate it to the identifier. When preparing the instruction sheets (211), it may be beneficial to consider the nature of the performers, such as what kind of performer (e.g., musician, actor, dancer, comedian, visual artist, culinary artisan), and nature of the performer (e.g., their musical instrument for a musician, their voice type for a singer, their skills as a choreographed artisan, or their gender and age for a thespian). Instruction sheets may be created, modified, adapted and/or reused from one performance to another.

In the performance phase 250, the performance assignments are distributed and the performers perform. This phase 250 may be cyclical, with the performers being addressed in sequence. The performers may be selected at random and at the discretion of the leader of the ensemble. The leader may be, for example, the conductor or a dance lead.

The process for each performer begins with selecting one of the cells/openings/access doors (251). This step 251 may be performed, for example, by an emcee, by a conductor or director, by an audience member, or by that performer. The cell, opening or access door may be selected at random.

Next, the opening is opened (252). The opening of the opening itself may be entertaining and imbued with showmanship. Lights and sounds may be part of this. For both the performers and the audience, there is a sense of anticipation and uncertainty which comes with the opening of the opening. This may be part of the show.

Next, the performance assignment is removed (253). This step 253 may be imbued with showmanship.

Next, the opening or access door may be closed (254) and the instruction sheet delivered to the performer (255). These two steps may be performed in either order. Both of these steps 254, 255 may be imbued with showmanship. Closing the opening may result in the opening being locked so that it will not be reopened during the show. In such a case, as part of the preparation phase 210, the openings are unlocked. If the opened cell has an instruction sheet, the instruction sheet is provided to the performer. If instead the opened cell has an identifier, the identifier is used to obtain the corresponding instruction sheet for the performer.

Next, the performer begins to perform (256). Someone, such as a conductor or director, may cue the performer. Depending on the performance instructions, it may be unnecessary for the performers to synchronize-they may overlap and blend. Some performers may finish earlier than others and some may finish within proximity to their fellow performers.

If there are more performers who need instruction sheets (257), the process returns to step 251. Otherwise, the process continues until the performance ends (295). The instructions sheets may include instructions for how the performers end. Alternatively, the performers may receive generic instructions before the performance which includes this. For example, when a musician comes to the end, they may be instructed to hold out their last note until their breathe breath or muscles or tone gives out and then patiently wait for their fellow ensemble performers to complete the music in front of them.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

The invention claimed is:

1. An apparatus comprising a dispenser for instruction sheets for a performance by a number X of performers, the dispenser comprising:
- an enclosure having a plurality Y of cells, each cell comprising a container having an opening, wherein Y is equal to or greater than X, and wherein the opening has an open state and a closed state;
- a number Z of instruction sheets, wherein Z is equal to or greater than X, wherein each instruction sheet has instructions for one part of the performance;
- wherein each instruction sheet is assigned to one of the cells;
- wherein, for each of the cells, opening the cell's opening to the open state provides access to one of either the instruction sheet contained within the cell or an identifier contained within the cell and corresponding to the instruction sheet.

2. The apparatus of claim 1 further comprising an indicator associated with each opening, wherein the indicator indicates whether the opening has been opened and the cell accessed.

3. The apparatus of claim 2 wherein the opening comprises a latch and a dial, wherein the dial is operable to retract the latch and thereby provide access to the cell, and the dial comprises the indicator.

4. The apparatus of claim 1 wherein each cell is a leather pouch, and the pouch contains a card bearing the identifier.

5. The apparatus of claim 1 wherein the instruction sheets are paper with written instructions.

6. The apparatus of claim 1 wherein at least one of the instruction sheets is an electronic display of written instructions.

7. The apparatus of claim 1 wherein the enclosure is shaped as a hexahedron.

8. The apparatus of claim 7 wherein the hexahedron is a cube.

9. A process for using a dispenser of performance instructions for an impromptu performance by a number X of performers, the dispenser comprising:
- (a) an enclosure enclosing a plurality Y of cells each having an opening, wherein Y is equal to or greater than X, and wherein the opening has an open state and a closed state;
- (b) a number Z of instruction sheets, wherein Z is equal to or greater than X, wherein each instruction sheet has instructions for one part of the performance, and wherein each instruction sheet is assigned to one of the cells, wherein each instructions sheet is either within the cell or there is an identifier corresponding to the instruction sheet within the cell;

the process comprising, for each performer:
- selecting one of the cells of the dispenser at random;
- opening the opening to the selected cell of the dispenser;
- retrieving from the selected cell one of either an instruction sheet or an identifier corresponding to the instruction sheet;
- closing the opening;
- providing the retrieved instruction sheet or identifier to the performer.

10. The process of claim 9 further comprising loading the instruction sheets or identifiers into the cells.

11. The process of claim 9, the dispenser further comprising an indicator associated with each opening, wherein if the opening has been opened the indicator provides an indication of this.

12. The process of claim 11 wherein the opening comprises a latch and a dial, wherein the dial is operable to retract the latch and thereby provide access to the cell, and the dial comprises the indicator.

13. The process of claim 11 wherein each cell is a leather pouch, and the pouch contains a card bearing the identifier.

14. The process of claim 11 wherein the instruction sheets are paper with written instructions.

15. The process of claim 11 wherein at least one of the instruction sheets is an electronic display of written instructions.

16. The process of claim 11 wherein the enclosure is shaped as a hexahedron.

17. The process of claim 16 wherein the hexahedron is a cube.

18. The process of claim 11 wherein the selecting step is performed by one or more of an emcee, a conductor, a director, an audience member, and the performer.

* * * * *